[12] United States Patent
Lo et al.

(10) Patent No.: US 7,796,533 B2
(45) Date of Patent: Sep. 14, 2010

(54) APPARATUS AND METHOD FOR BANDWIDTH CONTROL

(75) Inventors: Yung Chieh Lo, Miaoli (TW); Jin Ru Chen, Hsinchu (TW); Yu Mei Pan, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 306 days.

(21) Appl. No.: 11/729,394

(22) Filed: Mar. 28, 2007

(65) Prior Publication Data
US 2007/0230502 A1    Oct. 4, 2007

(30) Foreign Application Priority Data
Mar. 30, 2006    (TW) ............................... 95111142 A

(51) Int. Cl.
H04L 12/26    (2006.01)
H04L 12/28    (2006.01)

(52) U.S. Cl. ...................................... 370/252; 370/235

(58) Field of Classification Search ................. 370/412, 370/395.41, 395.42, 477, 252, 235
See application file for complete search history.

(56) References Cited

U.S. PATENT DOCUMENTS

| 5,337,338 | A * | 8/1994 | Sutton et al. .................. 377/33 |
| 6,594,718 | B1 * | 7/2003 | Ebner et al. ................. 710/240 |
| 6,748,408 | B1 * | 6/2004 | Bredin et al. ................ 708/271 |
| 7,430,172 | B2 | 9/2008 | Brandenburg et al. |
| 2004/0187045 | A1 * | 9/2004 | Butcher ...................... 713/500 |
| 2005/0025158 | A1 * | 2/2005 | Ishikawa et al. ........ 370/395.21 |
| 2006/0067233 | A1 * | 3/2006 | Fukuda et al. ............ 370/235.1 |
| 2006/0153042 | A1 * | 7/2006 | Chang ..................... 369/59.22 |
| 2006/0170585 | A1 * | 8/2006 | Stankwitz et al. ......... 342/25 A |
| 2006/0192860 | A1 * | 8/2006 | Atsumi et al. ............ 348/222.1 |
| 2006/0195603 | A1 * | 8/2006 | Seungdong Lee ........... 709/232 |
| 2006/0257038 | A1 * | 11/2006 | Hsieh et al. .................. 382/251 |
| 2007/0070895 | A1 * | 3/2007 | Narvaez ..................... 370/230 |

FOREIGN PATENT DOCUMENTS

WO    WO2004073265 A1    8/2004

OTHER PUBLICATIONS

Choi, "Discrete-time analysis of the leaky bucket scheme with threshold-based token generation intervals", Dept. of Math., Korea Adv. Inst. of Sci. & Technol., Taejon: South Korea. IEEE Proceedings-Communications, Apr. 1996, ISSN 1350-2425, vol. 143. pp. 105-111.

* cited by examiner

Primary Examiner—Alpus H Hsu
Assistant Examiner—Saad Hassan
(74) Attorney, Agent, or Firm—IPR Works, LLC

(57) ABSTRACT

An apparatus and method for bandwidth control is provided to keep the bandwidth more stable. The apparatus includes an interval signal generator, a storage unit, and a control circuit. The interval signal generator outputs a plurality of interval signals which are evenly or approximately evenly distributed over a time interval. The value of the storage unit corresponds to a transmittable data size. The control circuit adjusts the value of the storage unit according to the interval signals.

16 Claims, 6 Drawing Sheets

APPARATUS AND METHOD FOR BANDWIDTH CONTROL

BACKGROUND OF THE INVENTION (a). Field of the Invention

This invention relates to a network device, and more particularly, to bandwidth control of the network device.

(b). Description of the Prior Arts

In network bandwidth control techniques, the leaky bucket or token bucket is commonly used to shape irregular network traffic into a constant transmission rate. FIG. 1 is a schematic diagram illustrating the operation of a bandwidth control device using the leaky bucket. The leaky bucket 11 contains tokens where each token corresponds to a transmittable data size. The packets waiting in the packet queue 12 will be transmitted orderly after receiving the tokens. Thus the rate of data transmission can be adjusted by controlling the rate of refilling tokens in the leaky bucket 11, thereby controlling the bandwidth. Therefore, the leaky bucket 11 has a control parameter R in the unit of bps (bits per second) to define the token refill rate, which also represents the data transmission rate (i.e. bandwidth). The leaky bucket 11 is also set up with a burst size, which represents the maximum number of tokens it can hold. When the number of tokens accumulated in the leaky bucket 11 exceeds this burst size, subsequently refilled tokens will be discarded. In conventional schemes, tokens are refilled over a time interval. For example, if the token data size is 640 bits and time interval is 10 ms, then bandwidth R equals to 64 Kbps.

FIG. 2 is a diagram showing a conventional bandwidth control circuit, in which the value of register 21 represents the token data size, while the value of register 22 (i.e. leaky bucket) indicates the transmittable data size, which decreases as data are sent. Multiplexer 23 works according to the output of NOR gate 24. Counter 25 is used to control the duration of time interval. As shown in FIG. 2, in each time interval, multiplexer 23 will add tokens once to register 22.

However, conventional bandwidth control schemes run into the problem of unstable bandwidth. When the duration of time interval is set longer, the token data size to be refilled each time becomes bigger. If there are multiple packets to be sent, they might be sent all at once, which leads to rate burst and results in less stable bandwidth.

In the example of using register T (e.g. register 21 in FIG. 2) for storing token data size, and register I for storing time interval (in FIG. 2, counter 25 controls time interval based on the setting of register I), assuming register T and register I each has 4 bits, the token data size and time interval (in unit of bits and seconds respectively) can be any number from 1, 2, . . . , 15. FIG. 3 shows the number of bandwidths that can be generated when register T and register I each has 4 bits, in which, x axis represents bandwidth (in bps), y axis represents the number of bandwidths that can be generated by all combinations of register T value and register I value. As shown, bandwidths that can be expressed by the combinations of register T and register I concentrate in lower value section (under 5). Thus conventional bandwidth control is unable to achieve more subtle performance in higher bandwidth section, which means less flexibility in bandwidth control.

SUMMARY OF THE INVENTION

It is therefore one of objectives of this invention to provide an apparatus and method for bandwidth control to effectively improve the problem of rate burst, thereby stabilizing the bandwidth.

Another one of objectives of this invention is to provide an apparatus and method for bandwidth control which can flexibly configure the bandwidth to enhance the performance of bandwidth control.

According to an embodiment of this invention, an apparatus for bandwidth control used in a network device is provided. The apparatus comprises: an interval signal generator configured to output a plurality of interval signals during a time interval such that the interval signals are approximately evenly distributed over the time interval; a first storage unit for storing a value corresponding to a transmittable data size of the network device; and a control circuit, coupled to the interval signal generator, for adjusting the value of the first storage unit according to the interval signals.

DETAILED DESCRIPTION OF THE INVENTION

Figure 4:
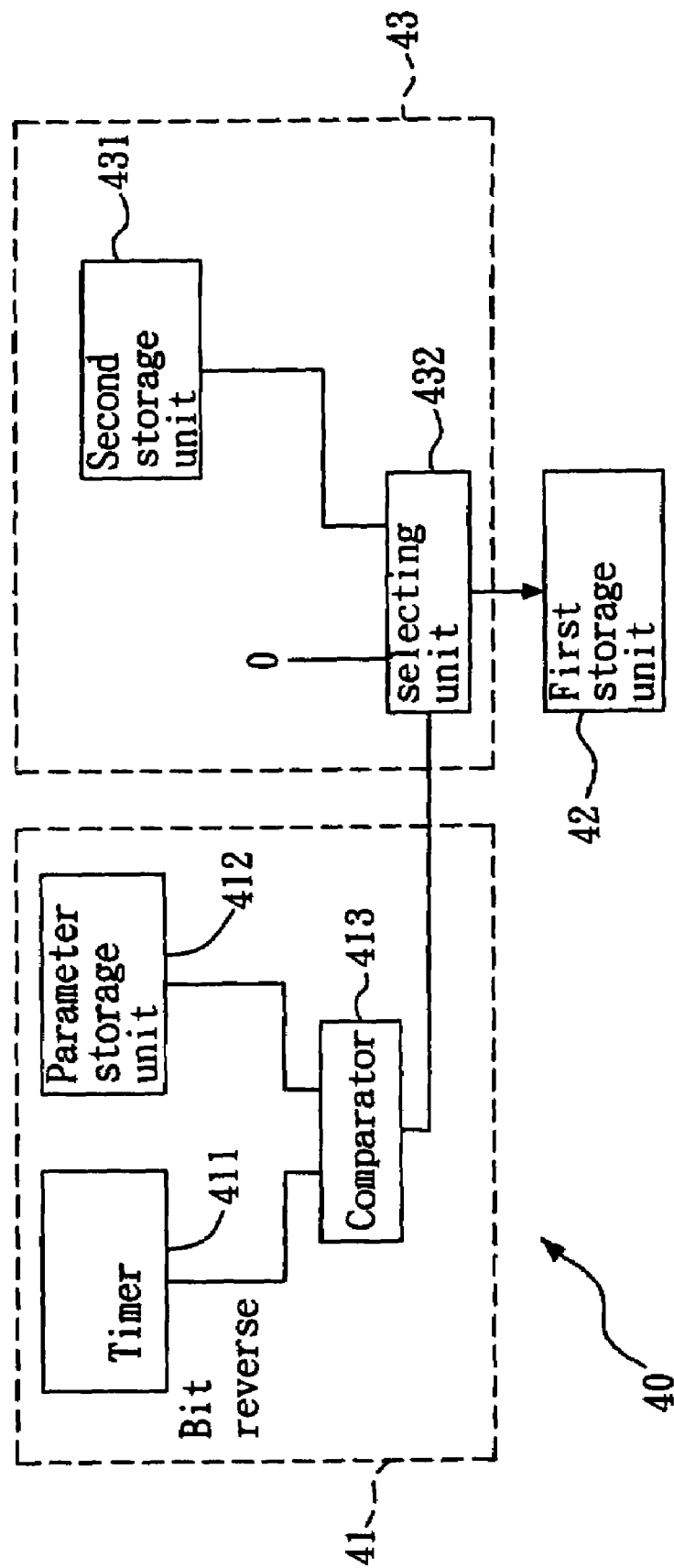
FIG. 4 is a block diagram of a bandwidth control apparatus according to a preferred embodiment of the invention.

FIG. 4 is a block diagram of a bandwidth control apparatus according to a preferred embodiment of the invention. The bandwidth control apparatus 40 is used in a network device. As shown in FIG. 4, the bandwidth control apparatus 40 comprises an interval signal generator 41, a first storage unit 42, and a control circuit 43. The interval signal generator 41 outputs a plurality of interval signals according to a total interval and a dividing factor.

In one embodiment, the interval signal generator 41 comprises a calculating unit and a counter. The calculating unit is used for dividing the total interval by the dividing factor to output a divided signal, and the counter outputs the interval signal according to the divided signal.

In FIG. 4, another embodiment of the interval signal generator 41 includes a comparator 413, a parameter storage unit 412, and a timer 411 which is a counter having a plurality of bits. The interval signal generator 41 outputs the interval signal according to a bit-reversed value of the timer 411. After bit reversal, the $k^{th}$ bit value of timer 411 (assuming having n bits) is its $(n-k-1)^{th}$ bit value before reversal (k=0~n−1). The timer 411 corresponds to a time interval, that is, the time duration for each cycle of the value of timer 411 (from 0 to maximum) is the time interval. The parameter storage unit 412 is for storing a parameter value (its meaning will be described below). The comparator 413 is coupled to the timer 411 and parameter storage unit 412 to compare the bit-reversed value generated by the timer 411 with the parameter value stored by the parameter storage unit 412, and output a corresponding control signal (i.e. the interval signal) to the control circuit 43. In this embodiment, the plurality of bits of the timer 411 and the parameter value correspond to the total interval and the dividing factor mentioned above, respectively.

The value of the first storage unit 42 is corresponding to the transmittable data size of network device, that is, the first storage unit 42 is used to perform the function of leaky bucket. The value of the first storage unit 42 is varied (e.g. decreased) when the network device transmits data in the form of packets. The control circuit 43 is coupled to the interval signal generator 41, and determines whether to incrementally add a unit value, which is stored in a second storage unit 431, to first storage unit 42 based on the interval signal output by the interval signal generator 41. The unit value of the second storage unit 431 is the data size a token corresponds to (i.e. token data size). In an embodiment, first storage unit 42 has a threshold (i.e. the burst size of leaky bucket). When first storage unit 42 reaches the threshold, control circuit 43 stops adding the unit value to the first storage unit 42. In another embodiment, if the network device is an Ethernet network device, the token data size is smaller than 64 bytes. Because Ethernet network requires a minimum packet size of 64 bytes, the transmission burst problem can be improved if the token data size refilled each time is kept under the size of minimum packet.

In FIG. 4, control circuit 43 comprises the second storage unit 431 and a selecting unit 432 which may be a multiplexer. The second storage unit 431 is used for storing the unit value, while the selecting unit 432 chooses the value of second storage unit 431 (i.e. unit value) or zero value according to the interval signal from the interval signal generator 41 and adds it to the first storage unit 42. In an embodiment, an adder (not shown in the figure) is used to execute the addition. When the bit-reversed value of timer 411 is smaller than the parameter value of the parameter storage unit 412, the selecting unit 432 will choose the unit value of the second storage unit 431 to be added to the first storage unit 42; when the bit-reversed value of timer 411 is not less than the parameter value of the parameter storage unit 412, the selecting unit 432 will choose zero value and add it to the first storage unit 42.

Figure 5:
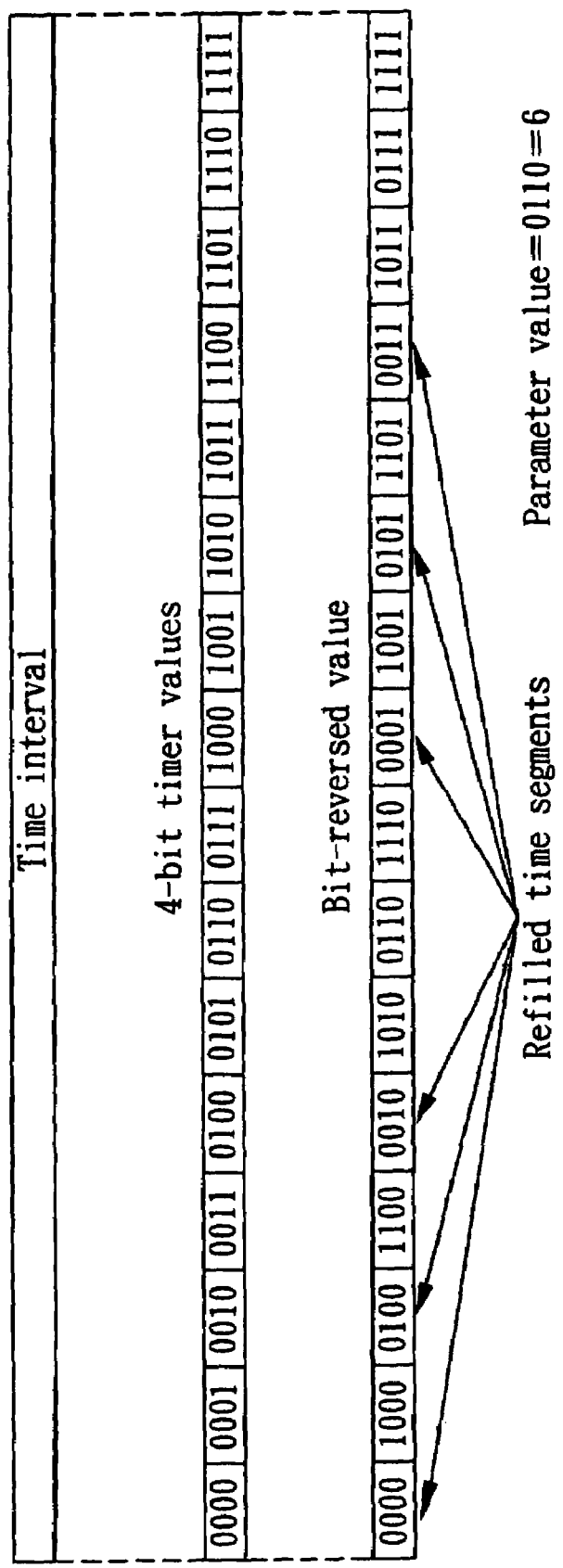
FIG. 5 is a diagram illustrating the embodiment of FIG. 4 with an example with a 4-bit timer and a parameter value of 6.

The operation of bandwidth control apparatus 40 can achieve the effect of approximately evenly distributing the refilled tokens during a time interval to effectively improve the rate burst problem. Specifically, bandwidth control apparatus 40 can cumulatively add the unit value (i.e. token data size) to the first storage unit 42 multiple times within a time interval corresponding to the interval signal generator 41 in a manner of approximately even distribution, and the number of times of additions equals the aforesaid parameter value. At this time, the bandwidth generated is: token data size×parameter value/time interval. FIG. 5 shows an example with a 4-bit timer 411 and a parameter value of 6. In the FIG. 5, the value of timer 411 changes in sequence from 0000 to 1111, with each value representing a time segment. Thus a time interval is divided into sixteen time segments. As shown in the FIG. 5, the bit-reversed values (0000, 0100, 0010, 0001, 0101, and 0011) of six time segments 0000, 0010, 0100, 1000, 1010, and 1100 are smaller than the parameter value (binary value of 6 is 0110). Thus unit values need to be added to the first storage unit 42. In addition, those six refilled time segments are approximately evenly distributed over the same time interval.

By changing the parameter value, the number of refills of token data size during a time interval can be adjusted. In an embodiment, the range of parameter value is decided according to the bandwidth range and bandwidth granularity of the network device, where the bandwidth granularity represents the minimum gap between different bandwidths. For example, with bandwidth range of 64 Kbps~1 Gbps, and bandwidth granularity of 64 Kbps, there will be $2^{14}$ bandwidths, from 64 Kbps, 128 Kbps, 172 Kbps . . . to 1 Gbps.

Given that the smallest bandwidth is equal to the bandwidth granularity, the range of parameter value can be set as $1\sim2^{14}$. That is, when the parameter value is $1, 2 \ldots 2^{14}, 1, 2 \ldots 2^{14}$ times of refills of token data size happen during each time interval, which generates respectively the bandwidth of 64 Kbps, 128 Kbps . . . to 1 Gbps. Thus in this embodiment, a 14-bit parameter storage unit 412 can be used to express the parameter value. Preferably, if the maximum and minimum bandwidths of the network device are respectively max and min, and the bandwidth granularity is gran, then the required bits for timer 411 is $$M_{(bit)} = \left\lceil \log_2\left(\frac{\max - \min}{\text{gran}}\right) \right\rceil.$$

In this embodiment, the timer 411 is also 14-bit.

Figure 1:
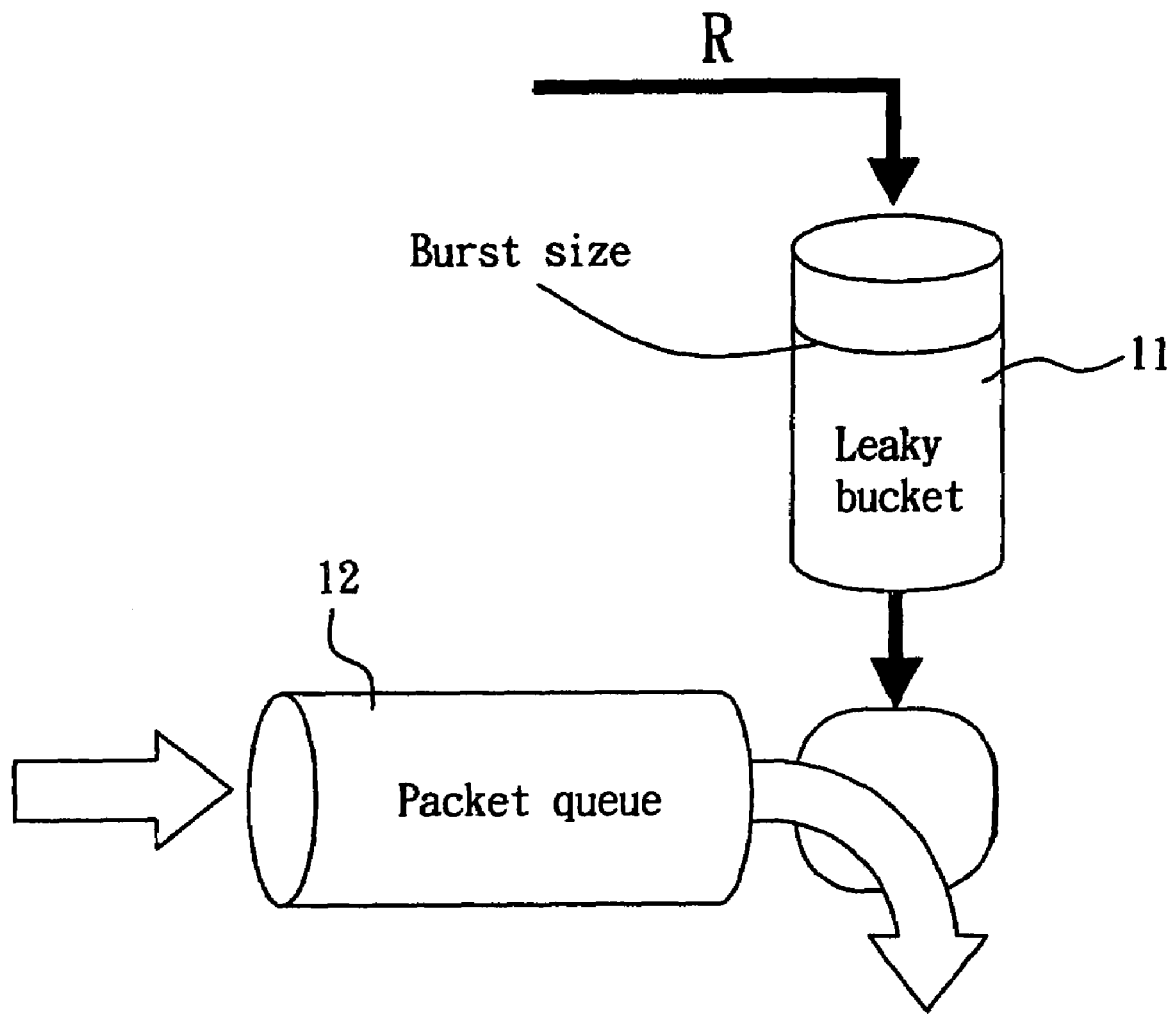
FIG. 1 is a schematic diagram illustrating the operation of a bandwidth control device using the leaky bucket.
Figure 2:
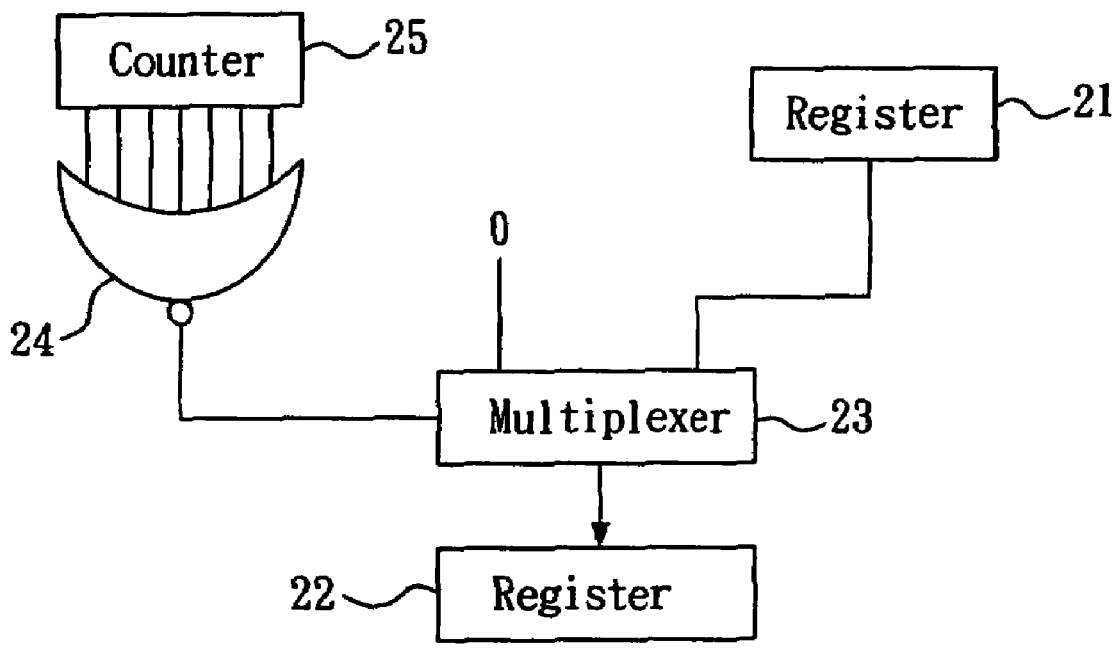
FIG. 2 is a diagram showing a conventional bandwidth control circuit.
Figure 3:
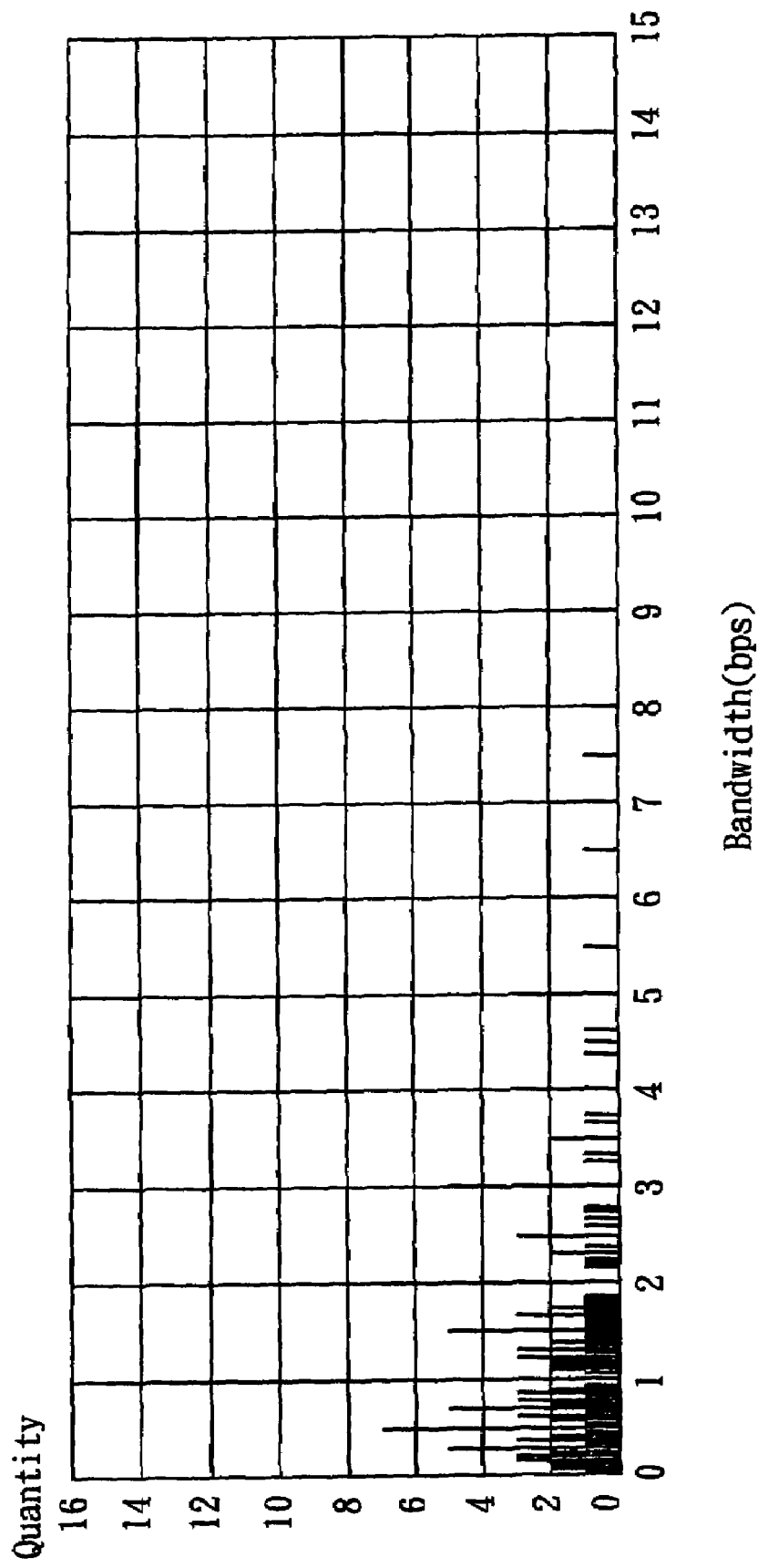
FIG. 3 shows the number of bandwidths that can be generated when register T and register I each has 4 bits.

In addition, the operation of bandwidth control apparatus 40 allows flexible bandwidth setting. FIG. 3 gives an example on how prior art lacks the flexibility in bandwidth setting. Take the example of 8-bit parameter storage unit 412 and bandwidth range of $$\frac{16}{256} \text{ bps} \sim 16 \text{ bps},$$

the range of parameter value that can be expressed by the 8-bit parameter storage unit 412 is 1 to 256, and the maximum bandwidth is 256 times the minimum bandwidth. Thus bandwidth granularity can be set as $$\frac{16}{256} \text{ bps}.$$

That is, a time interval is cut into 256 time segments. When the parameter value is k (=1~256), there are k time segments in each time interval that need a refill of token data $$\text{size}\left(= \text{time interval} \times \frac{16}{256} \text{bit}\right),$$

and the bandwidth generated is $$\frac{16 \, k}{256} \text{ bps}.$$

Thus the bandwidths generated are evenly distributed over the entire range, instead of converging in certain sections, thereby enhancing the flexibility of bandwidth control. For example, the generation of 9.5 bps bandwidth (which can not be achieved using prior art as shown in FIG. 3) can be achieved by setting the parameter value to $$152 \left(\frac{16*152}{256} = 9.5 \text{ bps}\right).$$

Figure 6:
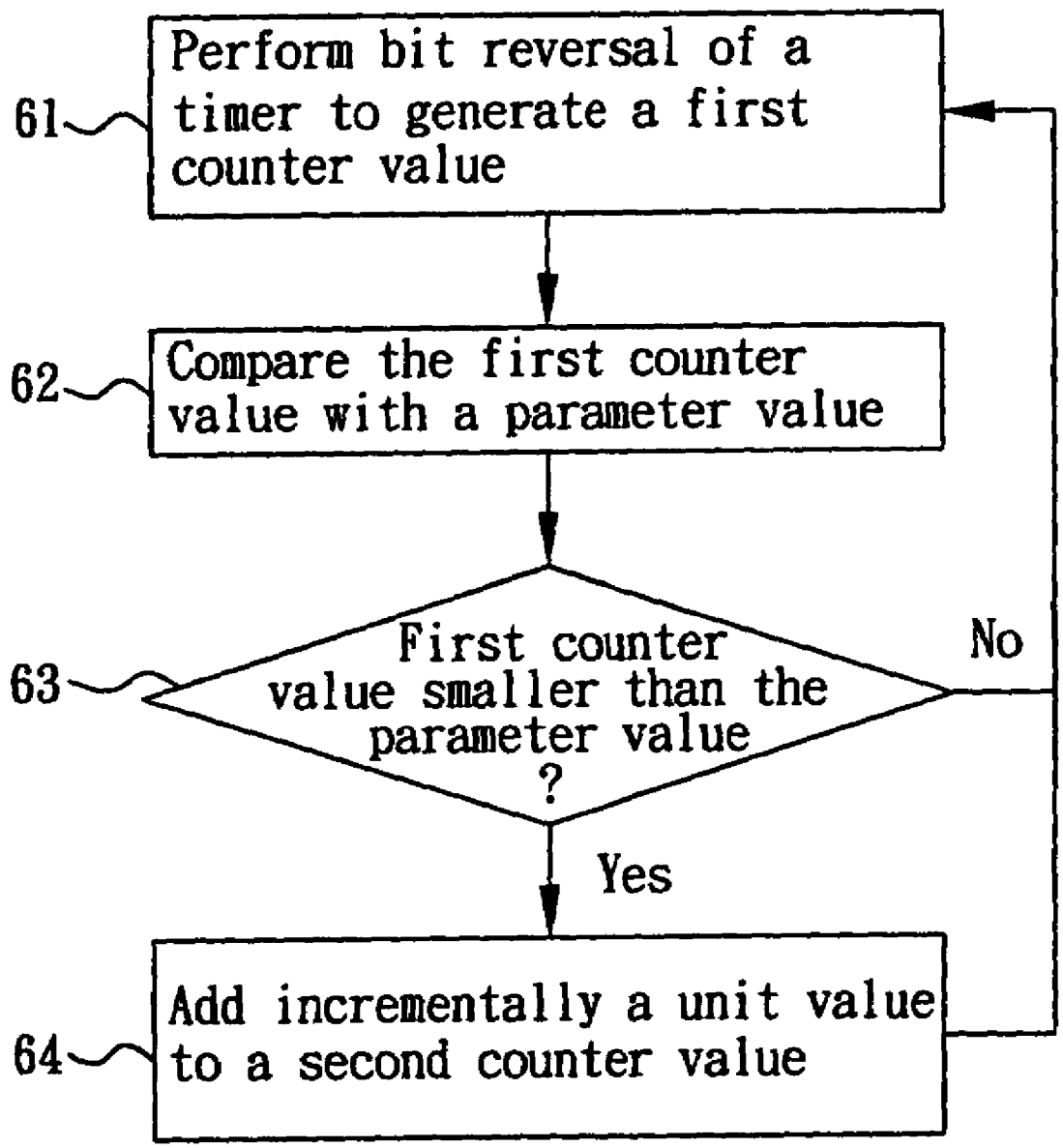
FIG. 6 shows a flow chart of one embodiment of the method for bandwidth control according to the present invention.

FIG. 6 shows a flow chart of one embodiment of the method for bandwidth control according to the present invention. In the embodiment, Steps 61~63 are used to perform an embodiment of interval signal generating method to generate interval signals. Step 64 is used to adjust the transmittable data size of a network device. The method comprises the following steps:

Step 61: Perform bit reversal of a timer to generate a first counter value, where the timer is a counter having a plurality of bits;

Step 62: Compare the first counter value with a parameter value;

Step 63: Determine whether the first counter value is smaller than the parameter value; if yes, execute step 64, otherwise jump back to step 61; and Step 64: Add a unit value incrementally to a second counter value and jump back to step 61, where the second counter value corresponds to the transmittable data size of a network device.

While the present invention has been shown and described with reference to the preferred embodiments thereof and in terms of the illustrative drawings, it should not be considered as limited thereby. Various possible modifications and alterations could be conceived of by one skilled in the art to the form and the content of any particular embodiment, without departing from the scope and the spirit of the present invention.

What is claimed is:

1. An apparatus for bandwidth control used in a network device comprises:
    an interval signal generator configured to output a plurality of interval signals during a time interval;
    a first storage unit for storing a value corresponding to a transmittable data size of the network device; and
    a control circuit, coupled to the interval signal generator, for adjusting the value of the first storage unit according to the interval signals;
    wherein the interval signals are generated according to a bit-reversed value of a multi-bit counter value such that the interval signals are substantially evenly distributed over the time interval;
    wherein the interval signal generator comprises:
        a bit reverse counter for generating the bit-reversed value;
        a second storage unit for storing a bandwidth control parameter; and
        a comparator for comparing an output value of the bit reverse counter with the bandwidth control parameter to output the interval signal.

2. The apparatus of claim 1, wherein the value of the first storage unit is varied when the network device transmits data.

3. The apparatus of claim 1, wherein the control circuit adjusts the value of the first storage unit according to a unit value.

4. The apparatus of claim 3, wherein if the network device is an Ethernet network device, a data size corresponding to the unit value is smaller than 64 bytes.

5. The apparatus of claim 3, wherein the control circuit comprises:
    a third storage unit for storing the unit value;
    a selecting unit, coupled to the third storage unit, for selectively outputting the unit value according to the interval signal; and
    an adder, coupled to the selecting unit and the first storage unit, for adding the unit value output by the selecting unit to the value of the first storage unit.

6. The apparatus of claim 1, wherein the range of the bandwidth control parameter is determined according to a bandwidth range and a bandwidth granularity of the network device.

7. The apparatus of claim 1, wherein the control circuit adjusts the value of the first storage unit according to the current value of the first storage unit.

8. The apparatus of claim 7, wherein when the current value of the first storage unit reaches a threshold, the control circuit stops adjusting the value of the first storage unit.

9. A method for bandwidth control in a network device comprising:
    outputting a plurality of interval signals during a time interval by an interval signal generator in the network device according to a bit-reversed value of a bit reverse timer such that the interval signals are substantially distributed over the time interval; and
    adjusting a transmittable data size by a control circuit in the network device according to the interval signals, wherein the transmittable data size is corresponding to a data size that the network device is allowed to transmits;
    wherein the step of outputting comprises comparing the bit-reversed value and a bandwidth control parameter to output the plurality of interval signals.

10. The method of claim 9, wherein the transmittable data size is adjusted when the bit-reversed value is smaller than the bandwidth control parameter.

11. The method of claim 9, wherein the number of bits of the bit reverse timer is corresponding to a range of the bandwidth control parameter.

12. The method of claim 9, wherein the number of bits of the bit reverse timer is determined according to a bandwidth range and a bandwidth granularity of the network device.

13. The method of claim 9, wherein when the transmittable data size reaches a threshold, the adjustment of the transmittable data size is stopped.

14. The method of claim 9, wherein the transmittable data size is adjusted according to a unit value.

15. The method of claim 14, wherein if the network device is an Ethernet network device, a data size corresponding to the unit value is smaller than 64 bytes.

16. The method of claim 9, wherein if the network device is an Ethernet network device, a data size corresponding to the unit value is smaller than 64 bytes.

* * * * *